United States Patent [19]

Kulich

[11] Patent Number: 5,633,304
[45] Date of Patent: May 27, 1997

[54] AGGLOMERATION OF LATICES BY ORGANIC ACID—ANHYDRIDE MIXTURES

[75] Inventor: Donald M. Kulich, Marietta, Ohio

[73] Assignee: General Electric Company, Pittsfield, Mass.

[21] Appl. No.: 540,358

[22] Filed: Oct. 6, 1995

Related U.S. Application Data

[62] Division of Ser. No. 274,595, Jul. 13, 1994, Pat. No. 5,468,788, which is a continuation of Ser. No. 60,392, May 11, 1993, abandoned.

[51] Int. Cl.$^6$ .................. C08K 5/09; C08F 279/00
[52] U.S. Cl. .................. 524/284; 525/71; 525/315; 525/316; 523/335; 523/352
[58] Field of Search .................. 524/284; 525/71, 525/315, 316

[56] References Cited

U.S. PATENT DOCUMENTS

| | | | |
|---|---|---|---|
| 3,509,237 | 4/1970 | Aubrey | 525/71 |
| 3,551,370 | 12/1970 | Dalton | 525/335 |
| 3,558,541 | 1/1971 | Dalton | 523/335 |
| 3,652,721 | 3/1972 | Dalton et al. | 525/71 |
| 3,793,403 | 2/1974 | Dalton et al. | 525/261 |
| 4,336,355 | 6/1982 | Wu | 525/316 |
| 4,385,157 | 5/1983 | Auclair et al. | 525/316 |
| 5,221,713 | 6/1993 | Kempner et al. | 525/71 |

OTHER PUBLICATIONS

Dalton, J., Coll. Inter. Sci, Rubber Latex Agglomeration by Acid Anhydride Addition, v. 43, No. 2, 339 (1973).

*Primary Examiner*—Mark L. Warzel

[57] ABSTRACT

A process is provided for agglomerating small rubber particles in an aqueous latex to form large rubber particles. The process involves the addition of a water soluble organic acid and a water soluble organic anhydride to the latex prior to agglomeration of the rubber particles to facilitate agglomeration of the rubber particles into large rubber particles which are essentially free of coagulum. The latex of large rubber particles is useful in the preparation of ABS polyblends.

2 Claims, No Drawings

AGGLOMERATION OF LATICES BY ORGANIC ACID—ANHYDRIDE MIXTURES

This is a divisional of application Ser. No. 08/274,595 filed on Jul. 13, 1994, now U.S. Pat. No. 5,468,788, which is a continuation of Ser. No. 08/060,392 filed May 11, 1993 which is now abandoned.

BACKGROUND OF THE INVENTION

1. Field of the Invention

The present invention relates to a process for agglomerating polymeric particulates in an aqueous latex, and more particularly relates to use in combination an organic acid and an organic anhydride to facilitate agglomeration of rubber particles in an aqueous latex.

2. Description of Related Art

Direct polymerization of diene monomers to large diameter rubber particles is typically a slow process via emulsion polymerization. Large rubber particles are desirable however in the production of ABS (acrylonitrile-butadiene-styrene) resin to produce resin exhibiting enhanced levels of impact strength. Chemical agglomeration processes exist for the production of large rubber particles from small rubber particles. These chemical agglomeration processes have in the past involved the addition of water soluble organic acids or water soluble organic anhydrides to facilitate agglomeration of the rubber particles. It has been discovered however that acid agglomeration and anhydride agglomeration of small rubber particles in an aqueous latex into large rubber particles in an aqueous latex can result in the formation of substantial amounts of coagulum (for example > than 2% by weight) based on the total weight of rubber which is undesirable in the rubber phase of ABS resins because big masses of rubber (coagulum) can adversely affect the appearance and physical properties of the ABS resin or create production issues. A prior agglomeration process is set out in Dalton U.S. Pat. No. 3,558,541 issued Jan. 26, 1971 and is incorporated herein by reference.

Accordingly, it is desired to have an agglomeration process for agglomerating small rubber particles into large-size rubber particles without the formation of substantial amounts of coagulum.

SUMMARY OF THE INVENTION

The present invention involves a process for agglomerating small rubber particles having a weight average particle size diameter of 0.05 to 0.20 microns to large rubber particles preferably having a weight average particle size diameter of 0.30 to 1.0 microns wherein the large rubber particle have a weight average diameter of at least 50 percent greater than the small rubber particles. The process may be either batch, semibatch or continuous and comprises adding a water soluble organic acid concurrently with a water soluble organic anhydride to a latex containing small rubber particles to facilitate agglomeration of the small particles into large particles without the formation of substantial levels of coagulum. The process may be employed as a step in a process for producing ABS graft copolymer resin. A process of the present invention for preparing ABS graft copolymers by grafting large diene rubber particles with vinylidene monomers such as alkenyl aromatic monomers and alkenyl nitrile monomers preferably involves:

A. forming an aqueous latex containing water and small diene rubber particles, the small rubber particles being dispersed in the latex by an anionic surfactant as particles having an average particle size diameter of about 0.05 to 0.20 microns, B. adding a water soluble organic acid and a water soluble organic anhydride to the aqueous latex, C. agglomerating the rubber particles, contained in the latex, to form large agglomerated rubber particles having a weight average particle size of about 0.3 to 1.0 microns, preferably 0.30 to 0.6 microns to form a latex which is essentially free of coagulum, (i.e., less than 2% by weight coagulum based on the total weight of rubber particles in the latex), D. stabilizing the large agglomerated rubber particles in the latex by the addition of a sufficient amount of a surfactant or base to the latex to stabilize the latex, E. polymerizing a mixture of alkenyl aromatic and alkenyl nitrile monomers in the presence of the stabilized latex so as to form a matrix phase polymer of the monomers and graft of the agglomerated rubber particles with at least a portion of the monomers thereby providing a latex containing the grafted rubber particles and the matrix polymer, F. separating the matrix polymers having the grafted diene rubber particle dispersed therein from the water of the latex to yield as an acrylonitrile-butadiene-styrene graft copolymer.

DETAILED DESCRIPTION OF THE INVENTION

Various rubbers for the small rubber particles may be agglomerated to form the large rubber particles onto which the vinyl monomers may be grafted during the polymerization to form the graft copolymer. Rubbers which are utilizable as the small rubber particles which are agglomerated to form large rubber particles which are used as the substrate of the graft copolymers include conjugated 1,3-diene rubbers, ethylene-propylene-diene terpolymer rubbers, acrylate-diene interpolymer rubbers, and mixtures thereof. Although saturated rubbers may be grafted, it has been found desirable to include at least a small amount (at least 1.0 percent by weight) of a diene monomer component such as 1,3-butadiene in order to facilitate grafting thereof. This diene monomer component may comprise 1 to 20 percent by weight and preferably 2 to 8 percent by weight of the ethylene/propylene/diene terpolymer or acrylate copolymer rubber.

The preferred rubbers are diene rubbers or mixtures of diene rubbers, i.e., any rubbery polymers (a polymer having a second order transition temperature not higher than $-20°$ centigrade, as determined by ASTM Test D-746-52T) or one or more conjugated 1,3-dienes and interpolymers of such 1,3-dienes with up to an equal amount by weight of one or more copolymerizable monoethylenically unsaturated monomers, such as monovinylidene aromatic hydrocarbons (e.g., styrene; an alkylstyrene, such as the o-, m-, and p-methylstyrenes, 2,4-dimethylstyrene, ethylstyrenes, p-tert-butylstyrene; and alpha-alkylstyrene, such as alpha-methylstyrene, alpha-ethylstyrene, alpha-methyl-n-methylstyrene; vinyl naphthalene; halo monovinylidene aromatic hydrocarbons (e.g., the o-, m-, and p-chlorostyrenes, 2,4-dibromostyrene, 2-methyl-4-chlorostyrene); acrylonitrile; methacrylonitrile; alkyl acrylates (e.g., methyl acrylate, butyl acrylate, 2-ethylhexyl acrylate), the corresponding alkyl methacrylates; acrylamides (e.g., acrylamide, methacrylamide, N-butyl acrylamide); unsaturated ketones (e.g., vinyl methyl ketone, methyl isopropenyl ketone); alpha-olefins (e.g., ethylene, propylene); pyridines;

vinyl esters (e.g., vinyl acetate, vinyl stearate); vinyl and vinylidene halides (e.g., the vinyl the vinylidene chlorides and bromides).

Although the rubber may contain up to about 2 percent of a cross-linking agent, based on the weight of the rubber-forming monomer or monomers, excessive crosslinking can result in loss of the rubbery characteristics. However, some cross-linking of the rubber is desirable to preserve proper morphology of the particles thus produced. Accordingly, some cross-linking during the grafting reaction is advantageous and inherent cross-linking can be further encouraged through the variation of graft polymerization conditions as is well known in the art. The cross-linking agent can be any of the agents conventionally employed for cross-linking diene rubbers, e.g., divinylbenzene, diallyl maleate, diallyl fumarate, diallyl adipate, allyl acrylate, allylmethacrylate, diacrylates and dimethacrylates of polyhydric alcohols, e.g., ethylene glycol dimethacrylate.

A preferred group of rubbers are those containing 75 to 100 percent by weight of butadiene and/or isoprene and up to 25 percent by weight of a monomer selected from the group consisting of monovinylidenearomatic hydrocarbons (e.g., styrene) and unsaturated nitriles (e.g., acrylonitrile), or mixtures thereof. Particularly advantageous rubbers are butadiene homopolymer or an interpolymer of 90 to 95 percent by weight butadiene and 5 to 10 percent by weight of acrylonitrile or styrene. The small rubber particles are prepared in a latex emulsion polymerization. The small rubber particles are then agglomerated by admixing therewith an organic acid and an organic anhydride, concurrently and preferably in the form of a mixture of acid and anhydride. The mixture typically improves the agglomeration speed by improving the water solubility rate of the anhydride. Preferably the rubber has a glass transition temperature of less than −20° C.

The polymerizable monomer grafting formulation for grafting onto the agglomerated rubber substrates will, of course, contain the monomers to be polymerized, initiator where required, and other desirable components such as stabilizers, and molecular weight regulators.

The specific monomers will, of course, vary with the desired product. However, the process is highly advantageously employed in the manufacture of vinylaromatic graft copolymers, i.e., polymerizable monomer formulations containing monovinyl aromatic hydrocarbons either alone or in combinations with other copolymerizable monomers such as unsaturated nitriles. Where a styrene-type monomer is employed solely, then the resultant product will be of the type known as an "impact styrene." Where styrene and acrylonitrile-type monomers are employed jointly in the polymerizable formulations, the resulting product will be of the type known as "ABS resin". However, it should be understood that the composition of the polymerizable graft formulation may vary widely.

Exemplary of the monovinyl aromatic monomers(alkenyl aromatic monomers) that may be homopolymerized or interpolymerized in the presence of the agglomerated rubber particles to form the graft are styrene; alpha-alkyl monovinylidene monoaromatic compounds, e.g., alpha-methylstyrene, alpha-ethylstyrene, alpha-methylvinyltoluene, alpha-methyl dialkylstyrene; ring-substituted alkyl styrene, e.g., vinyl toluene, o-ethylstyrene, p-ethylstyrene, 2,4-dimethylstyrene; ring-substituted halostyrenes, e.g., o-chlorostyrene, p-chlorostyrene, o-bromostyrene, 2,4-dichlorostyrene; ring-alkyl, ring-halo-substituted styrenes, e.g., 2-chloro-4-methylstyrene; 2,6-dichloro-4-methylstyrene; vinyl naphthalene; vinyl anthracene. The alkyl substituents generally have one to four carbon atoms and may include isopropyl and isobutyl groups. If so desired, mixtures of such monovinylidene aromatic monomers may be employed.

Exemplary or other vinyl monomers that may be employed solely or interpolymerized with monovinyl aromatic monomers are ethylenically unsaturated nitriles (alkenyl nitrile), such as acrylonitrile, methacrylonitrile, ethacrylonitrile and mixtures thereof; conjugated 1,3-dienes, e.g., butadiene, isoprene; alpha- or beta-unsaturated monobasic acids and derivatives thereof, e.g., acrylic acid, methyl acrylate, ethyl acrylate, butyl acrylate, 2-ethylhexyl acrylate, methacrylic acid and the corresponding esters thereof, acrylamide, methacrylamide; vinyl esters such as vinyl acetate, vinyl propionate; dialkyl maleates or fumarates such as dimethyl maleate, diethyl maleate, dibutyl maleate, the corresponding fumarates. As is known in the art, the amount of the foregoing materials useful as comonomers in a graft copolymer will vary.

The preferred vinyl monomer formulations of the present invention contain in at least principally of a monovinyl aromatic hydrocarbon and an ethylenically unsaturated nitrile, i.e., such monomers comprise at least 50.0 percent by weight and preferably at least 75.0 percent by weight of the grafting formulation. Most desirably, such monomers comprise at least 90.0 percent by weight of the formulation and the usual commercial compositions are substantially completely comprised of such monomers although minor amounts, i.e., less than 5.0 percent by weight of other components such as chain transfer agents, modifiers, may be included.

These preferred polymerizable monomer mixtures contain at least 10 percent by weight of the monovinyl aromatic hydrocarbon monomer and preferably at least 50 percent by weight thereof. They also contain at least 5 percent by weight of the unsaturated nitrile and preferably at least 10 percent by weight thereof. From the standpoint of highly advantageous commercial practice, to produce advantageous acrylonitrile-butadiene-styrene graft copolymer products, the monomer formulations contain 20 to 95 percent, and preferably 60 to 85 percent, by weight of the monovinylidene aromatic hydrocarbon based on the entire weight of the monomer formulation and 80 to 5 percent, and preferably 40 to 15 percent, by weight of the unsaturated nitrile based on he entire weight of the monomer formulation.

As has been indicated, a latex having a weight average particle size of between 0.05 and 0.20 microns is agglomerated to provide a weight average particle size diameter of 0.30 to 1.0 microns (weight average). Preferably the initial latex has small rubber particles having a weight average particle size diameter of 0.05 to 0.10 microns which are agglomerated to form a latex containing large rubber particles having a weight average particle size diameter of 0.30 to 0.60 microns, and preferably at least 0.5 microns.

In the preferred process, a mixture of an organic acid and an organic anhydride is added to a rubber latex and dispersed therein. The latex preferably uses as the emulsifier a soap. The latex is briefly mixed and then allowed to stand with minimal agitation until the mixture attacks the emulsifying agent and causes agglomeration of the rubbery particles. Substantial shear agitation during the portion of the process if avoided to prevent coagulation. The agglomeration may be batch or continuous. After the desired particle size has been obtained, the latex is stabilized by the addition of a base or a surfactant emulsifying agent.

The water soluble organic acid employed is preferably acetic acid although maleic acid, propionic, acrylic, oxalic acid, and other organic acids may be employed. The water soluble organic anhydride is preferably acetic anhydride although maleic anhydride, propionic anhydride and other organic anhydrides may be employed. The acid/anhydride addition is preferably made in organic acid to organic anhydride molar ratios of between 1:9 and 9:1 respectively, preferably between 2:8 and 8:2, more preferably between 25:75 and 75:25 respectively and most preferably between 40:60 and 60:40 respectively. The addition may be made by adding a mixture formed by admixing the organic acid and the organic anhydride in the above ratios either free of water in the mixture or with optionally an amount of water in the mixture such that the water is present at a level of from 1 to 99 percent by weight of the mixture and the combined weight of the acid and anhydride is present at a level of from 1 to 99 percent by weight of the mixture. The mixture of organic acid and organic anhydride must be readily water soluble.

Generally, the amount of acid/anhydride mixture employed will vary with the electrolyte and emulsifying agent present in the latex, the desired size of large rubber particles to be obtained and will be at least one-tenth the molar equivalent of the emulsifying agent. Normally, the amount employed is at least one-fourth the molar equivalent and preferably the amount added is in excess of the molar amount of the emulsifying agent.

The time for agglomeration will vary with temperature, the amount of organic acid/anhydride mixture and emulsifying agent, the nature of the rubbery polymer, the amount of the initial and desired sizes of the particles. Periods of five minutes to ten hours may be employed, with normal times of about five minutes to two hours being employed at ambient temperatures.

After the agglomeration reaction has taken place, the latex can be stabilized by the addition of an acid stable emulsifier or by the regeneration of the initial soap emulsifier by the addition of a basic compound to neutralize the acid. Anionic emulsifying agents such as alkali metal salts of long chain sulfonic acids have been employed successfully. An alkali metal hydroxide or other basic compound such as carbonate may be added to regenerate the fatty acid soap; the amount added will normally be the stoichiometric equivalent of the mixture of acid and anhydride although lesser amounts may be employed with some lessening in stability of the latex.

Anionic surfactants include alkali metal salts of fatty acids (oleic, stearic, palmitic, e.g.), alkyl or alkaryl sulfates, sulfonates phosphates and mixtures thereof.

Anionic surfactants available commercially usually have a hydrophilic moiety which is negatively charged in aqueous solutions or dispersions. Such products have either a carboxylate, sulfonate, sulfate or phosphate group. The anionic soaps have the general formula and composition $(RCOO)\text{-}(M)^+$ where R is an alkyl group, usually in the $C_8$ to $C_{21}$ range and M is a metallic or amine ion. The sulfonates have the general formula $(RSO_3)\text{-}(M)^+$ wherein R can be an alkyl or alkarylene group. The sulfates or sulfated products have the hydrophilic group-$OSO_3$-of the half ester sulfate ester surfactant is $—SO_3$ attached through an oxygen atom to a carbon atom of the hydrophobic moiety. The phosphate esters include alkyl ortho-phosphates and alkyl polyphosphates. Commercially available anionic surfactants are listed on the Kirk Othmer Encyclopedia of Chemical Technology, Volume 19, Second Edition, Interscience Publishers of John Wiley and Sons, N.Y., N.Y., pages 512–531 (1969) which is incorporated herein by reference. Oligomeric surfactants such as those set forth is U.S. Pat. No. 4,336,355 which is incorporated herein by reference, may also be employed.

The larger the agglomerated particle the greater the need to keep such particles colloidally dispersed in the latex and the greater the need to emulsify and distribute the grafting monomers used during polymerization and prevent the formation of coagulum. The latex should be adjusted to a pH of 8.0 to 13.0, preferably 10.0 to 12.0 to provide the most stable emulsion systems for grafting.

Generally, the emulsifying surfactant should be present in an amount of about 0.05 to 15 parts, preferably 0.1 to 5 parts, per 100 parts of rubber solids and monomer or final solids rubber and polymer, after polymerization.

The rubber lattices can be diluted with water to accommodate the additional monomers and polymer solids to be formed in amount of about 1 to 4 parts of water per part of monomers. The pH can be adjusted with alkaline metal hydroxides and salts, e.g. bicarbonates, e.g. to buffer the pH.

If the monomers are added incrementally during grafting they can be added in a water-oligomeric surfactant solution to increase latex stability as conversion of monomers to polymers approaches 100%.

The graft copolymer is prepared by polymerizing the monomer grafting formulation in the presence of the large rubber particles, generally in accordance with conventional graft polymerization techniques. In such graft polymerization, the preformed latex of large rubber particles generally are dispersed with the monomer and this admixture is polymerized to combine chemically or graft at least a portion of the monomers of the formulation upon the large rubber particles. Depending upon the ratio of monomers to rubbery substrate and polymerization conditions, it is possible to produce both the desired degree of grafting onto the large rubber particles and the formation of ungrafted polymer to provide the desired amount of matrix polymer at the same time. Normally, the ratio of monomers to rubber charged to the graft polymerization reaction is the primary determinant of the desired superstrate to substrate ratio of the resultant graft copolymer. However, conditions of polymerization, rubber chemistry and particle size, rates of monomer addition, chain transfer agents, also exert an effect.

The initiator or catalyst is generally included within the range of 0.001 to 1.0 percent by weight, and preferably on the order of 0.005 to 0.5 percent by weight of the polymerizable monomer, depending upon the monomers and the desired polymerization cycle. The initiator may be added incrementally to facilitate optimum grafting. As is well known, it is often desirable to incorporate molecular weight regulators such as mercaptans, halides and terpenes in relatively small percentages by weight, on the order of 0.001 to 2.5 percent by weight of the polymerizable monomer. In addition, it may be desirable to include relatively small amounts of antioxidants or stabilizers such as the conventional alkylated phenols, although these may be added during or after polymerization.

Various free radical polymerization initiators are conventionally used for emulsion polymerization of the rubber monomers to form the small rubber particles including conventional peroxy and azo catalysts, and the resultant latex containing residual initiator may be used as the aqueous medium with which the polymerizable monomers are mixed. Usually additional initiator will be added for graft polymerization. Exemplary of peroxy catalysts are the alkali metal peroxides, persulfates, perborates, peracetates and percarbonates, and hydrogen peroxide. If so desired, the initiator may be activated to form a redox system. In addition, it may be advantageous to include an oil-soluble initiator such as di-tert-butyl peroxide, benzoyl peroxide, lauroyl peroxide, allyl peroxide, toluyl peroxide, di-tert-butyl diperphthalate, tert-butyl peracetate, tert-butyl perbenzoate, dicumyl peroxide, tert-butyl peroxide, isopropyl peroxy dicarbonate, 2,5-dimethyl-2,5-di(tert-butylperoxy)hexane-3, tert-butyl hydroperoxide, cumene hydroperoxide, p-methane hydroperoxide, cyclopentane hydroperoxide, diisopropylbenzene hydroperoxide, p-tert-butyl-cumene hydroperoxide, pinene hydroperoxide, 2,5-dimenthylhexane-2,5-dihydroperoxide, and mixtures thereof. However, other free-radical generating catalysts may be employed such as actinic radiation.

The latex of the large rubber particles and the monomer grafting formulation is preferably polymerized in an inert atmosphere at temperatures in the range 20°–100° centigrade with agitation. Pressures of 1–100 lbs. per square inch may be employed. Although the entire amount of the monomer formulation may be present at the time that polymerization is commenced, generally it is preferable to add the monomer formulation either continuously or in increments over the major portion of the polymerization cycle. Normally, additional initiator is added incrementally or continuously over the portion of the cycle during which the monomer formulation is being added. Polymerization is continued until substantially all, i.e., more than 90 percent, of the monomers have been polymerized. The remaining monomer formulation or other volatile components may then be distilled from the latex which is dewatered, washed and dried. The latex may be dewatered by spray drying, by coagulation through the addition of salts.

The total amount of grafting monomer formulation to be added will normally amount to 70–250 parts by weight monomer per 100 parts by weight total rubber particles and preferably about 100–200 parts per 100 parts total rubber. The actual amount of monomer formulation added will vary dependent upon the grafting efficiency of the reaction and the desired superstrate to substrate ratio for the graft copolymers formed.

The polymerization cycle will normally range from 0.5 to 10 hours and preferably 1–2 hours. In accordance with the preferred procedure, the monomer formulation is added over approximately 20 to 100% of the total polymerization cycle. Although this addition may take the form of increments of varying size, the preferred technique utilizes substantially continuous addition at a relatively constant rate over 20% to 70% of the cycle.

As will be readily appreciated, the rubber content of the graft copolymer produced by the graft polymerization process of the present invention may be in excess of that desired for the final product since economics generally dictate the use of high rubber levels in the graft polymerization reaction. Accordingly, the graft polymerization product resulting from the graft polymerization reaction will normally be blended with a vinyl polymer of similar composition to increase the amount of matrix polymer and reduce the rubber level. This resinous polymer used for dilution of the graft copolymer may be produced by an emulsion process so that the latex thereof may be combined with the latex from the graft polymerization process and the mixed latex coagulated. Alternatively, the recovered graft copolymer may be admixed with a separately formed resinous polymer produced by emulsion, suspension or mass polymerization techniques.

Generally, the final polymer blends will contain 2–50 percent by weight of the total of the rubber components. Increasing the total amount of rubber graft in the composition generally increases the Izod impact strength of the composition but rapidly increases the viscosity of the blend and decreases the tensile strength at yield and fail and the tensile modulus. Accordingly, the preferred blends contain about 7–60 percent by weight of the graft copolymers based on the entire weight of the blend and most desirably about 25–50 percent by weight thereof.

An advantage of the present process over the simple use of either an organic acid alone or an organic anhydride alone in the formation of agglomerated rubber particles having a weight average particle size diameter of greater than 0.3 microns is that the present process produces lower levels of coagulum. Coagulum is undesirable in that it can adversely affect appearance and physical properties. Coagulum can be defined as a mass of rubber which separates from the latex and is typically formed by the essentially irreversible aggregation of rubber particles. Coagulum may be trapped by simple filtration processes and for the purpose of this invention may be defined as agglomerated rubber particle having a particle size diameter of greater than 0.42 millimeters and which may be trapped by a filter having a mesh of 40. Preferably the process of the present invention produces less than one percent by weight coagulum based on the total weight of rubber particles in the latex.

The disclosed process for agglomerating lattices of rubbery polymers to larger particle sizes utilizes a combination, preferably a solution, of a water soluble organic acid, such as acetic acid, and a water soluble organic acid anhydride, such as acetic anhydride. The acid-anhydride solution may be diluted with water and then mixed with a latex of small particles of a rubbery polymer such as polybutadiene or a butadiene copolymer. After briefly mixing, the latex is then allowed to stand for a sufficient period of time during which agglomeration of the particles to larger sizes occurs; the latex is then restabilized by the addition of a base or an acid stable surfactant.

A distinguishing feature of the present invention is the discovery that the use of an organic acid-organic acid anhydride mixture substantially reduces the amount of coagulum generated during the agglomeration process. Utilization of an organic acid-organic acid anhydride mixture can also reduce the amount of relatively expensive acid anhydride needed to induce agglomeration.

The agglomerated rubber particles can be admixed with small rubber particles to produce a bimodal rubber particle blend for use in making graft copolymers.

The rubber lattices thus produced may be grafted with various vinyl polymers in the manufacture of rubber reinforced plastics such as ABS. It has been noted that the rubber particle size and distribution in such systems may influence physical properties. The use of the acid-anhydride mixture provides an advantageous means of generating lattices with increased particle sizes with reduced coagulum levels.

It appears that the utilization of the organic anhydride in solution with the water soluble organic acid provides a unique balance that permits rapid introduction of the anhydride into the latex providing a more nearly homogeneous state while maintaining high agglomerating capability without excessively destabilizing the latex. The organic acid component along with the acid liberated by hydrolysis of the anhydride reduces the effective action of the emulsifying agent stabilizing the latex. Reducing the effectiveness of the emulsifying agent permits the polymer particles to collide and form larger particles. The total level of agglomerating agent needed to produce a particular particle size will depend on the composition of the latex to be agglomerated. The following examples illustrate the relative effects of acetic acid, acetic anhydride, and mixtures thereof on coagulum formation. Weight average particle size means weight average particle size as measured by transmission election microscopy.

EXAMPLE 1

This example illustrates the use of an acetic acid-anhydride mixture in the conversion of a polybutadiene latex from a weight average particle size of 0.075 microns to 0.56 microns. The small particle latex contains 40% total solids.

The agglomerating agent is prepared by adding 7.50 g of acetic anhydride (98.0% purity) to 2.89 g of glacial acetic acid (99.7% purity) to give a solution capable of generating 0.192 moles of hydrogen ion. The described solution is dissolved in 600 ml water, and the resulting aqueous agglomerating mixture at ambient temperature is admixed with 1125 g of the polybutadiene latex. The latex mixture is then allowed to stand undisturbed for 30 minutes after which the latex is restabilized by the addition of aqueous base. The percent coagulum determined as percent dry coagulum per dry solids is found to be 1.01% and the particle size is 0.56 microns.

EXAMPLES 2–5

These examples illustrates the effect of using acetic anhydride alone, acetic acid alone, and various other ratios of acetic acid to acetic anhydride. In each case, the process in Example 1 was repeated except the acetic acid to acetic anhydride ratio was adjusted keeping the total level constant such that each example is capable of providing 0.192 moles of hydrogen ion. The results are shown in Table 1. It can be seen that significantly reduced coagulum levels are achieved using the acetic acid-anhydride mixture in which acetic acid supplies 25% of the hydrogen ion and acetic anhydride mixture in place of acetic anhydride along or acetic acid alone. The mixture in which acetic acid and acetic anhydride each supply 50% of the available hydrogen gives a good balance of particle size enhancement at minimum coagulum for the particular latex treated.

In summary, the use of acetic acid-acetic anhydride mixtures can be substantially advantageous over the use of acetic acid alone or acetic anhydride alone. The ratio of acetic acid to anhydride and the total level of agglomerating agent may have to be adjusted to optimize particle size and minimize coagulum. Utilization of acetic acid along with acetic anhydride reduced the amount of the more expensive anhydride needed for agglomeration. Other water soluble acids whose ionization constant is greater than the conjugate acid of the emulsifying agent present in the latex should function as well.

TABLE 1

Effect of Acetic Acid - Anhydride Ratio Keeping Total H+ Constant at 0.192 Moles

| Example No. | Acetic Acid Grams | Acetic Anhydride Grams | Mole % H+ as Acid | Mole % H+ as Anhydride | Particle Size in Microns | % Coagulum |
|---|---|---|---|---|---|---|
| 1 | 2.89 | 7.50 | 25 | 75 | 0.56 | 1.0 |
| 2 | 0.00 | 10.00 | 0 | 100 | 0.58 | 16.4 |
| 3 | 11.56 | 0.00 | 100 | 0 | 0.51 | 19.2 |
| 4 | 5.78 | 5.00 | 50 | 50 | 0.51 | 0.6 |
| 5 | 8.67 | 2.50 | 75 | 25 | 0.46 | 0.6 |

What is claimed is:

1. A process for preparing rubber modified graft copolymers by grafting large diene rubber particles with alkenyl aromatic and alkenyl nitrile monomers comprising:
   A) forming an aqueous latex containing water and diene rubber solids, said rubber being dispersed in said latex by a surfactant as particles having a weight average particle size diameter of about 0.05 to 0.20 microns;
   B) adding a water soluble organic acid and a water soluble organic anhydride to said aqueous latex;
   C) agglomerating said rubber particles contained in said latex to larger agglomerated particles having a weight average particle size of between 0.30 to 1.0 microns, said larger agglomerated particles comprising less than 2 percent by weight coagulum having a weight average diameter of greater than 0.42 microns;
   D) stabilizing said larger agglomerated rubber particles in said latex by the addition to said latex of a sufficient amount of an ingredient selected from surfactants and bases;
   E) polymerizing a mixture of alkenyl aromatic and alkenyl nitrile monomers in the presence of said stabilized latex to graft said agglomerated rubber particles with at least a portion of said monomers and to form an ungrafted alkenyl aromatic alkenyl nitrile matrix polymer, thereby forming a latex containing said grafted rubber particles and said matrix polymer; and
   F) separating said matrix polymers having said grafted diene rubber particle from said water.

2. The process of claim 1 where said acid is acetic acid and wherein said anhydride is acetic anhydride.

* * * * *